United States Patent
Krishnaprasad et al.

(10) Patent No.: US 7,873,649 B2
(45) Date of Patent: *Jan. 18, 2011

(54) METHOD AND MECHANISM FOR IDENTIFYING TRANSACTION ON A ROW OF DATA

(75) Inventors: Muralidhar Krishnaprasad, Foster City, CA (US); Viswanathan Krishnamurthy, Fremont, CA (US); Ravi Murthy, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 09/949,020

(22) Filed: Sep. 6, 2001

(65) Prior Publication Data

US 2002/0078094 A1  Jun. 20, 2002

Related U.S. Application Data

(60) Provisional application No. 60/230,878, filed on Sep. 7, 2000.

(51) Int. Cl.
*G06F 7/00* (2006.01)
*G06F 17/30* (2006.01)

(52) U.S. Cl. ........................ 707/759; 707/706; 707/713; 707/722; 707/736; 707/781; 707/791

(58) Field of Classification Search ............... 707/2, 707/3, 5, 10, 103, 104.1, 201, 513; 345/581; 709/229, 232, 200–201, 206
See application file for complete search history.

(56) References Cited

U.S. PATENT DOCUMENTS

| | | | |
|---|---|---|---|
| 5,999,941 A | 12/1999 | Andersen | 707/103 |
| 6,012,067 A * | 1/2000 | Sarkar | 707/103 R |
| 6,240,407 B1 | 5/2001 | Chang et al. | |
| 6,253,195 B1 | 6/2001 | Hudis et al. | |
| 6,269,380 B1 | 7/2001 | Terry et al. | |
| 6,279,006 B1 | 8/2001 | Shigemi et al. | |
| 6,282,537 B1 | 8/2001 | Madnick et al. | |
| 6,366,934 B1 | 4/2002 | Cheng et al. | |

(Continued)

FOREIGN PATENT DOCUMENTS

WO  WO01/33433 A1 * 5/2001

(Continued)

OTHER PUBLICATIONS

Cheng, J.; Xu, J.XML and DB2. IBM Laboratory. Data Engineering 2000, Proceedings. 16th International Conference in May 2000.*

(Continued)

*Primary Examiner*—Usmaan Saeed
(74) *Attorney, Agent, or Firm*—Hickman Palermo Truong & Becker LLP

(57) ABSTRACT

Techniques are provided for using XML syntax in exchanging data in relational databases. According to certain embodiments of the invention, one or more portions of the relational database is visualized as an XML document. A standard Uniform Resource Locator (URL) mechanism is provided to access data stored in the relational database by defining the URL as an XPath expression over the visualized XML document.

38 Claims, 5 Drawing Sheets

U.S. PATENT DOCUMENTS

| | | |
|---|---|---|
| 6,418,448 B1 | 7/2002 | Sarkar |
| 6,438,540 B2 | 8/2002 | Nasr et al. |
| 6,449,620 B1 | 9/2002 | Draper et al. |
| 6,510,434 B1* | 1/2003 | Anderson et al. ............ 707/100 |
| 6,516,327 B1 | 2/2003 | Zondervan et al. |
| 6,574,655 B1* | 6/2003 | Libert et al. ................. 709/200 |
| 6,584,459 B1 | 6/2003 | Chang et al. |
| 6,591,295 B1* | 7/2003 | Diamond et al. ............ 709/217 |
| 6,604,100 B1 | 8/2003 | Fernandez et al. |
| 6,636,845 B2 | 10/2003 | Chau et al. |
| 6,643,633 B2* | 11/2003 | Chau et al. ..................... 707/1 |
| 6,684,204 B1* | 1/2004 | Lal ................................ 707/3 |
| 6,721,727 B2 | 4/2004 | Chau et al. |
| 6,766,330 B1* | 7/2004 | Chen et al. .................. 707/102 |
| 6,772,413 B2* | 8/2004 | Kuznetsov .................. 717/136 |
| 6,785,673 B1 | 8/2004 | Fernandez et al. |
| 6,810,429 B1* | 10/2004 | Walsh et al. ................. 709/246 |
| 6,871,204 B2* | 3/2005 | Krishnaprasad et al. ............. 1/1 |
| 6,918,082 B1* | 7/2005 | Gross et al. ................. 715/511 |
| 6,947,945 B1* | 9/2005 | Carey et al. ................. 707/102 |
| 6,976,210 B1* | 12/2005 | Silva et al. .................. 715/513 |
| 7,028,028 B1 | 4/2006 | Balmin et al. |
| 7,031,956 B1 | 4/2006 | Lee et al. |
| 7,043,716 B2 | 5/2006 | Zimmer et al. |
| 7,051,071 B2* | 5/2006 | Stewart et al. .............. 709/204 |
| 7,062,507 B2 | 6/2006 | Wang et al. |
| 7,072,896 B2* | 7/2006 | Lee et al. .................... 707/101 |
| 7,124,137 B2 | 10/2006 | Lin et al. |
| 7,260,585 B2* | 8/2007 | Krishnaprasad et al. ..... 707/694 |
| 2001/0037345 A1 | 11/2001 | Kiernan et al. |
| 2001/0047372 A1* | 11/2001 | Gorelik et al. .............. 707/514 |
| 2002/0015042 A1* | 2/2002 | Robotham et al. .......... 345/581 |
| 2002/0035606 A1* | 3/2002 | Kenton ....................... 709/206 |
| 2002/0038358 A1 | 3/2002 | Sweatt, III et al. |
| 2002/0054090 A1* | 5/2002 | Silva et al. .................. 345/747 |
| 2002/0073019 A1 | 6/2002 | Deaton |
| 2002/0078094 A1* | 6/2002 | Krishnaprasad et al. ..... 707/513 |
| 2002/0091725 A1* | 7/2002 | Skok ....................... 707/501.1 |
| 2002/0100027 A1 | 7/2002 | Binding et al. |
| 2002/0116371 A1* | 8/2002 | Dodds et al. ................... 707/3 |
| 2002/0116457 A1 | 8/2002 | Eshleman et al. |
| 2002/0120685 A1* | 8/2002 | Srivastava et al. ........... 709/203 |
| 2002/0123993 A1* | 9/2002 | Chau et al. ..................... 707/5 |
| 2002/0124100 A1* | 9/2002 | Adams ....................... 709/232 |
| 2002/0133497 A1* | 9/2002 | Draper et al. ............... 707/100 |
| 2002/0156772 A1 | 10/2002 | Chau et al. |
| 2002/0169788 A1* | 11/2002 | Lee et al. ................. 707/104.1 |
| 2002/0169842 A1* | 11/2002 | Christensen et al. ........ 709/206 |
| 2002/0184401 A1 | 12/2002 | Kadel et al. |
| 2002/0198874 A1 | 12/2002 | Nasr et al. |
| 2003/0014397 A1* | 1/2003 | Chau et al. ..................... 707/3 |
| 2003/0028563 A1 | 2/2003 | Stutz et al. |
| 2003/0065659 A1 | 4/2003 | Agarwal et al. |
| 2003/0126136 A1* | 7/2003 | Omoigui ...................... 707/10 |
| 2003/0140308 A1 | 7/2003 | Murthy et al. |
| 2003/0158897 A1* | 8/2003 | Ben-Natan et al. .......... 709/204 |
| 2003/0200214 A1 | 10/2003 | Doole et al. |
| 2004/0006563 A1 | 1/2004 | Zwiegincew et al. |
| 2004/0015783 A1 | 1/2004 | Lennon et al. |
| 2004/0064466 A1 | 4/2004 | Manikutty et al. |
| 2004/0143581 A1 | 7/2004 | Bohannon et al. |
| 2004/0148278 A1 | 7/2004 | Milo et al. |
| 2004/0167904 A1 | 8/2004 | Wen et al. |
| 2004/0193575 A1 | 9/2004 | Chen et al. |
| 2004/0199524 A1 | 10/2004 | Rys et al. |
| 2004/0260691 A1 | 12/2004 | Desai et al. |
| 2004/0267719 A1 | 12/2004 | Doherty et al. |
| 2004/0267760 A1 | 12/2004 | Brundage et al. |
| 2005/0004892 A1 | 1/2005 | Brundage et al. |
| 2005/0022115 A1 | 1/2005 | Baumgartner et al. |
| 2005/0044078 A1* | 2/2005 | deVries et al. .................. 707/9 |
| 2005/0097084 A1 | 5/2005 | Balmin et al. |
| 2005/0160076 A1 | 7/2005 | Kanemasa |
| 2005/0210002 A1 | 9/2005 | Pal et al. |
| 2005/0289125 A1 | 12/2005 | Liu et al. |
| 2005/0289138 A1 | 12/2005 | Cheng et al. |
| 2006/0010124 A1 | 1/2006 | Lucas et al. |
| 2006/0101320 A1* | 5/2006 | Dodds et al. ................. 715/500 |
| 2006/0224576 A1 | 10/2006 | Liu |
| 2007/0038780 A1* | 2/2007 | Christensen et al. ........ 709/246 |
| 2007/0233645 A1* | 10/2007 | Peterson et al. ................ 707/3 |
| 2010/0070448 A1* | 3/2010 | Omoigui ...................... 706/47 |

FOREIGN PATENT DOCUMENTS

WO     WO 01/65419 A2     9/2001

OTHER PUBLICATIONS

Cindy Xinmin Chen and Ashok Malhotra. XML Queries via SQL. IBM Thomas Watson Research Center 1999.*

Ernesto Damiani et al. Securing XML Documents. LNCS 1777, pp. 121-135. Pub. Mar. 2000.*

Josephine Cheng and Jane Xu. IBM XML Extender. An end-to-end solution for storing and retrieving XML documents. IBM Silicon Valley. Copyright IEEE Feb. 2000.*

Ernesto Damiani et al. Design and implementation of an access control processor for XML documents. Computer Networks 33 (2000) pp. 59-75. Pub. Jun. 2000 by Elsevier B.V.*

SQL Server 2000 XML Enhancements. By Rich Rollman: Lead Program Manager XML technologies. Microsoft Corp. 5-324. PowerPoint Presentation at Microsoft TechEd 2000, Jun. 5-8, Orlando, Fla.*

R. Bourret, C. Bornhovd, A. Buchmann. A generic load/extract utility for data transfer between XML documents and Relational Databases. IEEE Jun. 8-9, 2000.*

XML and DB2. by Josephine Cheng and Jane Xu. IBM Santa Teresa Laboratory. Feb. 29-Mar. 3, 2000.*

All Your Data: The Oracle Extensibility Architecture. Sandeepan Banerjee et al. Published 1999.*

[Feb. 9, 2000] From Jonathan Robie: There is a paper 'Projection and Transformation in XML Queries'.*

Managing XML documents in object-relational databases (1999) by Meike Klettke, Holger Meyer.*

Enabling Your Business Data for XML with DB2 XML Extender. Jane Xu & Josephine Cheng. IBM. Xtech2000 (Pub. Feb. 29, 2000).*

Data Engineering. IEEE Sep. 1999. vol. 22 No. 3. Bulletin. Special Issue on XML.*

Daniela Florescu et al., "A Performance Evaluation of Alternative Mapping Schemes for Storing XML Data in a Relational Database," May 1999, XP-002168318, pp. 1-31.

"Oracle8i—The XML Enabled Data Mangement System"—Oracle Corporation: Sandeepan Banerjee, Vishu Krishnamurthy, Muralidhar Krishnaprasad and Ravi Murthy, paper published in IEEE Conference—ICDE 2000, pp. 561-568.

"A Performance Evaluation of Storing XML Data in Relational Database Management Systems,"—Latifur Khan and Yan Rao—ACM-2001 (pp. 31-38).

"From XML Schema to Relations: A Cost-Based Approach to XML Storage"—Bell Laboratories: Philip Bohannon, Juliana Freire, Prasan Roy and Jerome Simeon—IEEE—2002—Proceedings of the 18th International Conference on Data Engineering (ICDE'02), 12 pages.

"SRQL: Sorted Relational Query Language"—Raghu Ramakrishnan, Donko Donjerkovic, Arvind Ranganathan, Kevin S. Beyer and Muralidhar Krishnaprasad—Jul. 1-3, 1998 IEEE pp. 84-95.

Schmidt et al.—"Efficient Relational Storage and Retrieval of XML Documents"—CWI, The Netherlands (pp. 1-6).

"Oracle 9i Project XDB"—The XML Database—Oracle—2001 (pp. 1-18).

Banerjee et al. "Oracle 8i—The XML Enabled Data Management System"—Data Engineering, IEEE/Mar. 2000 (pp. 561-568.

Lawrence et al. "Integrating Relational Database Schemas Using a Standarized Dictionary"—2001—ACM (pp. 225-230).

R. Bourret et al.: A generic Load/Extract Utility for Data Transfer Between XML Documents and Relational Databases, Jun. 8-9, 2000, IEEE computing SOC., pp. 134-143.

Cheng, Josephine et al., "IBM DB2 XML Extender, An end-to-end solution for storing and retrieving XML documents," IEEE, ICDE '00 Conference, San Diego, Feb. 2000, 128 pages.

Melton, John, "ISO-ANSI Working Draft; XML-Related Specifications (SQL/XML)," WG3: DRS-020, H2-2002-365, Aug. 2002, 154 pages.

Oracle Corporation, "Oracle9i XML Database Developer's Guide—Oracle XML DB," Release 2 (9.2), Mar. 2002, Part No. A96620-1, pp. 4-31-4-35, 5-21-5-24 and 5-70-5-71.

W3C, "XML Schema Part 1: Structures," W3C Recommendation, May 2, 2001, <http://www.w3.org/TR/2001/REC-xmlschema-1-20010502/>, pp. 1-203.

W3C, "XML Schema Part 2: Datatypes," W3C Recommendation, May 2, 2001, <http://www.w3.org/TR/2001/REC-xmlschema-2-20010502/>, pp. 1-146.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

Choi, Byron et al., "The XQuey Formal Semantics: A Foundation for Implementation Optimization," May 31, 2002, IEEE XP-002353605, 15 pages.

Funderbunk, J. et al., "XML programming with SQL/XML and XQuery", *IBM Systems Journal*, XP-002295973 (2002), pp. 642-665.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the $27^{th}$ Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Daniele Braga et al., "A Graphical Environment to Query XML Data with Query," Proceedings of the Fourth International Conference on Web Information Systems Engineering (WISE '03), 2003, IEEE, 10 pages.

European Patent Office, "Communication Pursuant to Article 96(2) EPC," App. No. 01 970 715.7, sated Jul. 19, 2006, 8 pages.

Amended Claims, App. No. 01 970 715.7, 13 pages.

Australian Office Action; Examiner's first report on patent application No. 2001290693, dated Jun. 27, 2006, 4 pgs.

Australian Application No. 2001290693—current claims, 17 pgs.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

Zemke, Fred, "XMLQuery," Change Proposal, ISO/IEC JTC1/SC32 WG3:SIA-nnn ANSI NCITS H2-2004-02lrl, Mar. 14, 2004, 29 pages.

U.S. Appl. No. 10/956,300, filed Sep. 30, 2004, Office Action Mailing Date May 31, 2007.

U.S. Appl. No. 11/098,887, filed Apr. 4, 2005, Office Action Mailing Date Jul. 10, 2007.

Gennick, Jonathan, "SQL in, XML out", May/Jun. 2003, Oracle Magazine, 5 pages.

Australian Government, "Examiner's first report on patent application No. 2007229359", 2 pages.

Claims, patent application No. 2007229359, 8 pages.

Australian Government, "Examiner's first report on patent application No. 2007229358", 2 pages.

Claims, patent application No. 2007229358, 8 pages.

European Patent Office, "Communication Pursuant to Article 94(3) EPC", Application No. 05 760 442.3-2201, dated Jun. 20, 2008, 2 pages.

Claims, Application No. 05 760 442.3-2201, 8 pages.

IP Australia, "Examiner's Report No. 2," Patent App. 2001290693, 2 pages.

Current Claims Patent App. 2001290693, 7 pages.

* cited by examiner

| SCHEMA 102 | OBJECTS 104 |
|---|---|
| SCOTT | EMP |
| JONES | DEPT |
| ⋮ | ⋮ |

FIG 1A

PURCHASE ORDER TABLE 200

| PURCHASE ORDER NUMBER 250 | PURCHASE ORDER LINK 260 | |
|---|---|---|
| 1 | http://machineA/serveletA/db1/user1/table1/row[PO NO=1000]/PO | 271 |
| 2 | ftp://machineB/serveletB/db2/user2/table2/row[PO NO=2000]/PO | 272 |
| 3 | /Tom/Table3/row[PO NO=3000]/PO | 273 |

FIG 2B

METHOD AND MECHANISM FOR IDENTIFYING TRANSACTION ON A ROW OF DATA

RELATED APPLICATIONS

Priority Claim

This application is related to and claims domestic priority under 35 U.S.C. §119(e) from prior U.S. Provisional Patent Application Ser. No. 60/230,878 filed on Sep. 7, 2000 entitled "XML DATA STORAGE, QUERY REWRITES, VISUALIZATION, MAPPING AND REFERENCING", by inventors Muralidhar Krishnaprasad, Vishwanathan Krishnamurthy, and Ravi Murthy, the entire disclosure of which is hereby incorporated by reference as if fully set forth herein.

This application is related to U.S. patent application Ser. No. 09/948,949, which was filed on Sep. 6, 2001 and issued as U.S. Pat. No. 6,871,204 on Mar. 22, 2005, and which is entitled "APPARATUS AND METHOD FOR MAPPING RELATIONAL DATA AND METADATA TO XML," naming as inventors Muralidhar Krishnaprasad, Vishwanathan Krishnamurthy, Ravi Murthy and Visar Nimani, the entire disclosure of which is hereby incorporated by reference as if fully set forth herein; and This application is related to U.S. patent application Ser. No. 09/948,998, which was filed on Sep. 6, 2001 and issued as U.S. Pat. No. 7,024,425 on Apr. 4, 2006, and which is entitled "METHOD AND APPARATUS FOR FLEXIBLE STORAGE AND UNIFORM MANIPULATION OF XML DATA IN A RELATIONAL DATABASE SYSTEM", naming as inventors Muralidhar Krishnaprasad, Vishwanathan Krishnamurthy, and Ravi Murthy, the entire disclosure of which is hereby incorporated by reference as if fully set forth herein.

FIELD OF THE INVENTION

The present invention relates generally to relational databases and, more specifically, to XML visualization of a database and DBURI references to database objects.

BACKGROUND OF THE INVENTION

On the World Wide Web, there is a need to reference data from different sources inside documents. The standard way of referencing such data is through the use of URIs—or universal resource identifiers. Since a vast majority of the data lies inside relational databases, it is necessary to support a standard URI based access methods to such data. Typically, such applications are written using standard mechanisms like Servlets, which in-turn may execute SQL statements to retrieve and format the database data. Significant processing is often needed to convert the results of the SQL data into a standard format required by the user, such as extensible Markup Language (XML). XML is a World Wide Web Consortium (W3C) standard for representing data.

Based on the foregoing, it is clearly desirable to provide a less cumbersome mechanism and technique for allowing clients, such as browsers, that support accessing resources using URLs, to access relational data.

SUMMARY OF THE INVENTION

Techniques are provided for allowing a user to view and retrieve data from a relational database in XML format. Techniques are provided for
(1) the user to access this data through the World Wide Web by providing URI references to such data, and
(2) to store and perform operations on these URI references inside the database.

Techniques are also provided for using XML syntax in exchanging data with relational databases. According to certain embodiments of the invention, an access mechanism is provided that allows one or more portions of the relational database to be accessed as if it were an XML document. Users may navigate through those "visualized" portions of the database using XPath expressions. Techniques are also provided to modify the "visualized" portions of the database and these modifications are converted to relational database operations such as SQL DMLs and DDLs.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates schemas and schema objects in a relational database;

FIG. 2B is a block diagram that illustrates a relational database table that stores Uritype data.

DETAILED DESCRIPTION OF THE PREFERRED EMBODIMENT

Figure 1B:
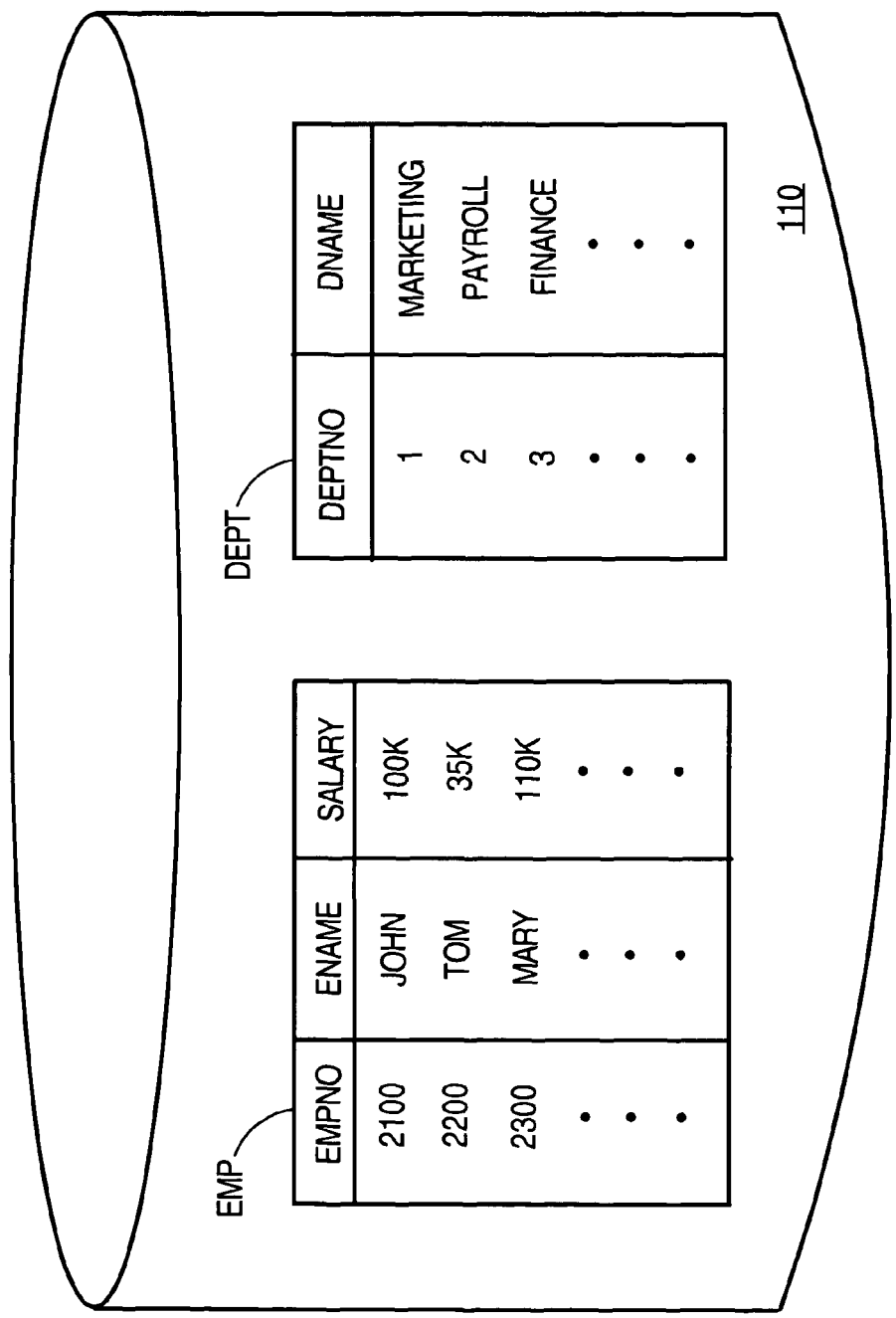
FIG. 1B is a block diagram that illustrates tables stored in a relational database.

Techniques are provided for using XML syntax for accessing data in relational databases. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Data within relational databases are typically accessed by sending commands to database servers that manage the databases. Such commands must conform to a database language supported by the database server. Structured Query Language (SQL) is a database language supported by many database systems.

Functional Overview

Using the techniques described herein, any particular user of the relational database, herein referred to as the "current user", can visualize as an XML tree all the tables and views and the associated schema, in the relational database, to which the current user has been granted access privileges. In other words, the user, instead of seeing the database data in the form of tables and views, the data is presented to the user in the form of an XML document, and the typical structure of an XML document is a tree.

There may be several concurrent current users of the database. However, for the purpose of simplifying the description, the techniques described herein refer to a single current user. The XML tree is hereafter referred to as a "visualized XML document". The visualized XML document comprises XML representations of the tables and views and the associated schema. Because the XML document is based on the access rights of a user, the XML document will vary from user to user based on each user's access rights. Thus, the visualized XML document, as described herein, is associated with the current user.

The data items that are identified by a URL or URI, and that are to be accessed in a relational database, are referred to herein as "target data". Target data may vary from implementation to implementation. Target data may be any one of numerous types of data, such as relational database schema objects, relational data, control files, etc. The present invention is not limited to target data of any particular type.

In order for the current user to access and manipulate target data in the relational databases as if the target data are XML data, a mechanism is provided for: 1) defining a default virtual visualization of any relational database for the current user, including all of the data for which the current user has access privileges in the relational database, wherein the default virtual visualization is defined as a canonical XML document, 2) providing a standard Uniform Resource Indicator (URI) that is locally defined within the database and by which one or more fragments of the visualized XML document can be accessed by defining the URI as an XPath expression over the visualized XML document, 3) providing a standard Uniform Resource Locator (URL) as a mechanism that can be used in conjunction with a web browser that is external to the relational database for accessing data stored in the relational database by defining the URL as an Xpath expression over the visualized XML document, 4) providing, in the relational database, new data types and new object types that can be used for storing the URIs and URLs, and 5) providing a mechanism to modify, create, add or delete data in the relational database through the visualized document, using the standard URIs and URLs as described herein.

XPath expressions are W3c standard ways of navigating XML documents. XPath expressions allow for traversals and insert/deletes/updates on the visualized XML document (the XML visualization of the relational database). The XPath expressions can be converted into SQL Data Definition Language (DDL) and Data Manipulation Language (DML) commands in the relational database.

The combination of (1) XML visualization of the relational database, and (2) the mechanism for navigating through the visualized XML document using XPath expressions, allows the user to "point to" any data in the relational database. For example, an XPath expression such as, /SCOTT/EMP/ROW [EMPNO=2100] points to the data value in the row identified by EMPNO=21. The row in question is in a relational database table called EMP, which is a schema object of the relational database schema called Scott.

The XML visualization of the relational database is described in greater detail herein.

Virtual XML Visualization of a Relational Database and XPATH

According to certain embodiments, the current user can see all the data in the relational database, to which the user has been granted access privileges, as a visualized XML document. The visualized XML document includes a "database tag" and a set of schemas with tables and views. For example, if the database is called "oradb" then the XML document starts with the database tag "<oradb>" and ends with the database tag "</oradb>".

The current user is permitted to read, insert, update and delete elements from the visualized XML document. The current user is thus unaware of the actual nature of the storage or access of the data in the relational database. The current user simply uses XPath expressions for navigation through the visualized XML document.

For example, assume that the current user of the relational database is Scott. Associated with each current user of the relational database is a schema by the same name. A schema is a logical collection of relational database objects such as tables, views clusters, functions, etc.

FIG. 1A is a block diagram that illustrates schemas and schema objects in a relational database. Column 102 of FIG. 1A contains a list of schema objects. For the purpose of explanation, only two schemas, SCOTT and JONES, are shown. Column 104 contains the relational database objects in each schema. For the purpose of explanation, only two tables, EMP and DEPT, are shown. Schema SCOTT contains table EMP and schema JONES contains table DEPT.

FIG. 1B is a block diagram that illustrates tables stored in a relational database. Relational database 110 contains tables, EMP and DEPT. Table EMP has 3 columns, EMPNO, ENAME and SALARY. Each column of EMP contains rows of values. Table DEPT has 2 columns, DEPTNO and DNAME. Each column of DEPT contains rows of values.

Assume that the current user, Scott, has privileges to access schemas SCOTT and JONES in the relational database and has privileges to access the data associated with SCOTT and JONES. According to certain embodiments of the techniques, the current user, Scott, is able to see a default virtual visualization of the relational database as follows (not the full visualization):

```
<oradb>
    <SCOTT>
        <EMP>
            <ROW>
                <EMPNO>21</EMPNO>
                <ENAME>John</ENAME>
                <SALARY>100,000</SALARY>
            </ROW>
            <ROW>
                .... <!-- other emp values -->
            </ROW>
            ...
        </EMP>
        .... <!-- other tables.. -->
    </SCOTT>
    <JONES>
        <DEPT>
            <ROW>
                <DEPTNO>1</DEPTNO>
                <DNAME>Marketing</DNAME>
            </ROW>
            <ROW>
                .... <!-- other dept values -->
            </ROW>
        </DEPT>
    </JONES>
</oradb>
```

The above default virtual visualization is merely an example of one implementation of a default virtual visualization. The default virtual visualization may vary from implementation to implementation. The invention is not restricted to a particular visualization model.

According to certain embodiments of the techniques, a standard URL and URI mechanism is also provided to access the data stored in any database, by defining the URL and URI as an XPath expression over the visualized XML document.

According to one embodiment of the invention, the URL may be processed by using a servlet, which uses the native URI processing mechanisms to access the data pointed by the URL.

According to certain embodiments of the invention, the database tag (oradb) may be implicitly bound in the processing context and need not be explicitly specified in the URL.

A current user who does not have local access to the relational database may use a browser to access data in the relational database over the Internet by using a URL. For example, assume that the current user is Scott and that Scott would like to use a browser to access the employee-name column of EMP table at the row for which the employee number is 2100, and where the EMP table is in schema SCOTT. The URL that Scott would use may look like the following:

http://machine-name/servlet-name/SCOTT/EMP/ROW [EMPNO=2100]/ENAME

In the above URL, the database tag, "oradb", is implicitly bound, and thus the user need not specify the database tag in the URL.

The result of accessing the URL or the URI would be a fragment of the visualized XML document containing the ename argument as shown below:

```
<? xml version="1.0"?>
<ENAME> John</ENAME>
```

The current user can augment the URL or URI with content types to specify the Multipurpose Internet Mail Extensions (MIME) type of the output. For example, if the URL points to a BLOB (Binary Large OBject) column that is storing an image, wherein the image is the "target data", then the content type can be set to gif. Thus, in response to using the URL, the current user obtains the image rather than, for example, a large hexadecimal file.

As another example, the current user may augment the URL to request, as the target data, the text value of the column to which the URL points. For example, assume that the current user, Scott, uses the following URL to access the employee-name column of EMP table at the row for which the employee number is 2100:

```
http://machine-name/<servlet-name>/
/SCOTT/EMP/ROW[EMPNO=2100]/ENAME/text( )
```

"text( )" is an XPath standard to identify the text node. The use of text( ) in the above URL would produce a result that contains only the text value in the employee-name column of EMP table at the row for which the employee number is 2100. The text value in the employee-name column of EMP table at the row for which the employee number is 2100 is "John". Thus, the result of accessing the above URL using text( ) is "John". In contrast, when text( ) is not used in the URL to access the employee-name column in the example, "John" is inlined inside a fragment of the visualized XML document as follows:

```
<ENAME> John</ENAME>
```

In another embodiment of the invention, the mime information may be derived automatically by the database, based on other auxiliary information that may be stored with the URL or through user written functions.

Mapping Rules for Defining Virtual XML Visualization of a Relational Database

Techniques are provided for defining the default virtual visualization of the database as a canonical XML document. According to one embodiment, the rules for defining the default virtual visualization are as follows:

1) There is a pseudo top-level enclosing tag that identifies the relational database that contains the target data. An example of a pair of enclosing tags that identify the relational database that contains the target data is <oradb> . . . </oradb>, where "oradb" is the name of the relational database that contains the target data, as shown below (not all the elements in the visualization are shown):

```
<oradb>
    <SCOTT>
        <EMP>
            <ROW>
                <EMPNO>21</EMPNO>
                <ENAME>John</ENAME>
                <SALARY>100,000</SALARY>
            </ROW>
            ...
        </EMP>
        .... <!-- other tables.. -->
    </SCOTT>
    <JONES>
        <DEPT>
            <ROW>
                .... <!-- other dept values -->
            </ROW>
        </DEPT>
    </JONES>
</oradb>
```

2) Each schema in the relational database for which the current user has been granted access privileges corresponds to one element in the visualized XML document. The name of the element is the same as the name of the schema to which the element corresponds. In the example illustrated herein, the schema SCOTT in the relational database "oradb" is represented by the element with the same name in the visualized XML document. Similarly, the schema JONES is represented by the element with the same name in the visualized XML document. The following visualized XML document is a visualization of the relational database down to the schema element level. For the purpose of illustration, only the elements corresponding to schemas SCOTT and JONES are shown.

```
<oradb>
    <SCOTT>
    </SCOTT>
    <JONES>
    </JONES>
</oradb>
```

3) Each table or view in the relational database for which the current user has been granted access privileges corresponds to one element in the visualized XML document. The name of the element is the same as the name of the table or view to which the element corresponds. In the example illustrated herein, the table EMP in the relational database "oradb" is represented by the element with the same name in the visualized XML document. Similarly, the table DEPT is represented by the element with the same name in the visualized XML document. The following visualized XML document is a visualization of the relational database down to the table element level. For the purpose of illustration, only the elements corresponding to tables EMP and DEPT are shown.

```
<oradb>
    <SCOTT>
        <EMP>
        </EMP>
    </SCOTT>
    <JONES>
        <DEPT>
        </DEPT>
    </JONES>
</oradb>
```

4) Each row of each table or view in the relational database for which the current user has been granted access privileges corresponds to one element in the visualized XML document. The following visualized XML document is a visualization of the relational database down to the row element level. For the purpose of illustration, only the elements corresponding to rows of tables EMP and DEPT are shown.

```
<oradb>
    <SCOTT>
        <EMP>
            <ROW>
            </ROW>
            ... <!—multiple ROW tag pairs - each pair
            corresponding to a single row>
        </EMP>
    </SCOTT>
    <JONES>
        <DEPT>
            <ROW>
            </ROW>
            ... <!—multiple ROW tag pairs - each pair
            corresponding to a single row>
        </DEPT>
    </JONES>
</oradb>
```

5) Each column of each table or view in the relational database for which the current user has been granted access privileges corresponds to one element in the visualized XML document. The name of the element is the same as the name of the column to which the element corresponds. In the example illustrated herein, the column EMPNO in table EMP is represented by the element with the same name in the visualized XML document. Similarly, the column ENAME is represented by the element with the same name in the visualized XML document. The following visualized XML document is a visualization of the relational database down to the column element level. For the purpose of illustration, only the elements corresponding to columns EMPNO and ENAME in table EMP are shown.

```
<oradb>
    <SCOTT>
        <EMP>
            <ROW>
                <EMPNO>2100</EMPNO>
                <ENAME>JOHN</ENAME>
                <SALARY>100000</SALARY>
            </ROW>
            <ROW>
                <EMPNO>2200</EMPNO>
                <ENAME>TOM</ENAME>
                <SALARY>35000</SALARY>
            </ROW>
            .... <!—other rows..>
        </EMP>
    </SCOTT>
    <JONES>
        <DEPT>
            <ROW>
                <DEPTNO>1</DEPTNO>
                <DNAME>MARKETING</DNAME>
            </ROW>
            ... <!—other rows..>
        </DEPT>
    </JONES>
</oradb>
```

Rules for Converting XPath Expressions Into Relational Database Queries

According to one embodiment of the invention, the Xpath query over the XML visualization may be translated into relational database queries and the result formatted in XML. Techniques are provided for converting XPath expressions into relational database queries. For the purpose of explanation, assume that the XPath expression that is to be converted into a query is in the context of the relational database "oradb". Thus, the format of a typical XPath expression is the context of "oradb" can be generalized as follows:

/Schema/Table/Row/Column/Attribute . . . (! further attributes)

Each element of the above XPath expression may optionally have a predicate. Predicates take the form,

[(element) (operator) (value)]

For example, the element, Row, may have a predicate as follows,

/Schema/Table/Row [Column1=2100]/Column2

The rules for converting XPath expressions into relational database queries will refer to the above general format for an XPath expression and are as follows:

1) An XPath expression of the form /Schema/Table is converted to a corresponding relational database query such as the following SQL statement, Select *

From Schema.Table

The syntax used in the preceding statement is merely illustrative. The actual syntax of SQL statements may vary from implementation to implementation. The present invention is not limited to any particular syntax.

The results of the SQL statement can then be converted into a corresponding fragment of the visualized XML document.

2) An XPath expression of the form /Schema/Table/Row/Column is converted to a corresponding relational database query such as the following SQL statement, Select Column From Schema.Table The syntax used in the preceding statement is merely illustrative. The actual syntax of SQL statements may vary from implementation to implementation. The present invention is not limited to any particular syntax.

The results of the SQL statement can then be converted into a corresponding fragment of the visualized XML document.

3) An XPath expression of the form /Schema/Table/Row [Empno=2100]/Column is converted to a corresponding relational database query such as the following SQL statement, Select Column2
From Schema.Table
Where Column1=2100

The syntax used in the preceding statements is merely illustrative. The actual syntax of the query language statements may vary from implementation to implementation. The present invention is not limited to any particular syntax. The results of the query language statement can then be converted into a corresponding fragment of the visualized XML document.

URI Types

According to certain embodiments, a special data type is provided in the relational database for storing URIs and URLs in the relational database. Such a data type is herein referred to as an "Uritype". URIs and URLs can be stored in columns in relational database tables by defining the URIs and URLs as Uritype data.

Figure 2A:
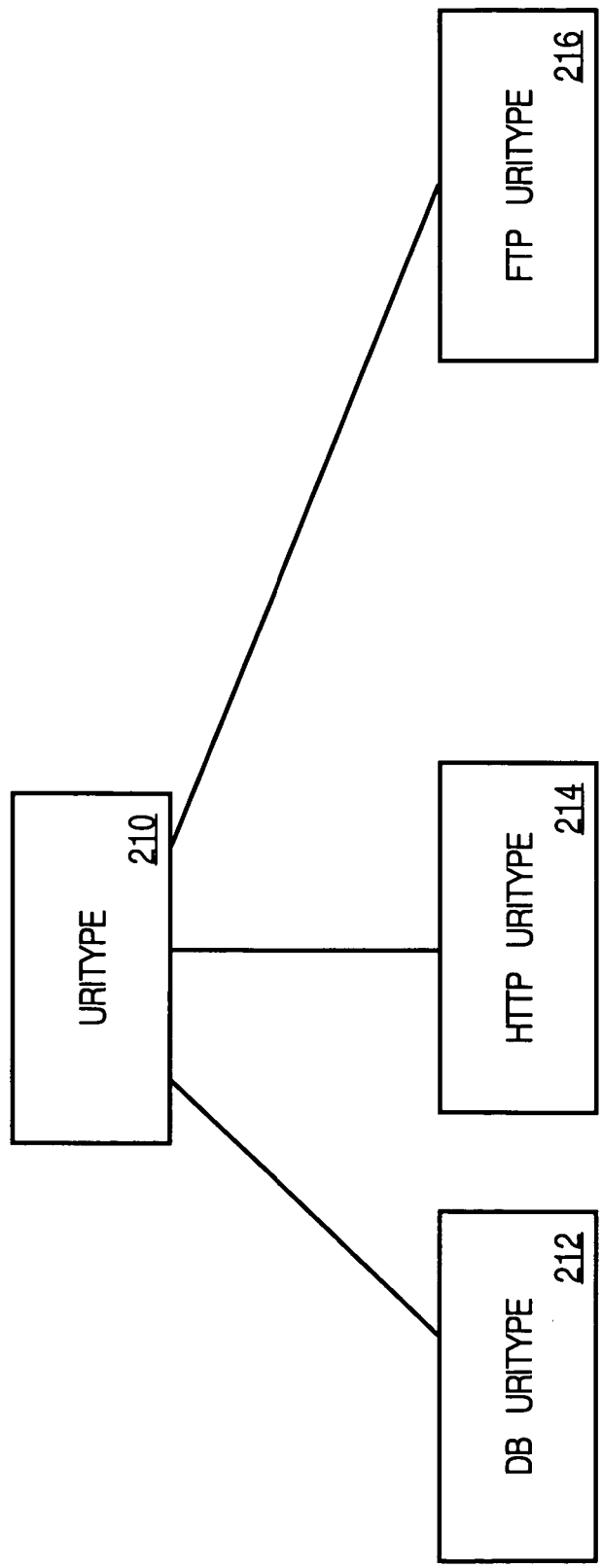
FIG. 2A is a block diagram that illustrates a hierarchy of Uritypes.

FIG. 2A is a block diagram that illustrates a hierarchy of Uritypes. FIG. 2A shows a general Uritype 210 that comprises subtypes. According to certain embodiments, the subtypes are DB-Uritype 212, HTTP-Uritype 214, and FTP-Uritype 216.

The HTTP-Uritype stores HTTP (HyperText Transfer Protocol) URLs, and fetches the data pointed to by the URL using the HTTP protocol. The FTP-Uritype stores FTP (File Transfer Protocols) URLs and fetches the data, using FTP. The DB-Uritype stores intra-database references using the Xpath mechanism described herein.

The DB-Uritype can fetch the data associated with the URL using the Xpath translation mechanism defined earlier or through other mechanisms.

The user may define subtypes of the Uritype or any of the other subtypes, and provide the implementation for getting the data pointed to by that URL.

Apart from being able to store URIs and URLs, the general functions associated with the Uritype data type include retrieving URIs and URLs as well as retrieving XML documents that are stored as LOBs, for example, CLOBs and BLOBs, in the relational database.

When the current user wishes to retrieve target data, pointed to by the URL, from the relational database, the current user's XPath expressions are automatically converted into appropriate query language statements. The actual syntax of such statements depend on the query language used in the relational database and may vary from implementation to implementation. The present invention is not limited to any particular syntax. The relational database functions of the Uritype data type can be abstracted by the following statements:

getURL( );
getBLOB( );
getCLOB( );
getXML( );

The preceding statements merely illustrate function. Such statements are not necessarily query language statements. The invention is not restricted to a particular set of query language statements.

FIG. 2B is a block diagram that illustrates a relational database table that stores Uritype data. Relational database table 200 is a Purchase Order table. Table 200 has 2 columns: Purchase Order Number column 250 and Purchase Order Link column 260. Both columns 250 and 260 contain 3 rows of data, namely, row 271, row 272 and row 273. The Purchase Order Link column can store data of type UriType.

Column 260 at row 271 stores data of type HTTP-Uritype. Column 260 at row 272 stores data of type FTP-Uritype. Finally, column 260 at row 273 stores data of type DB-Uritype. Note that since the DB-Uritype, HTTP-Uritype etc., have been defined as subtypes of the UriType type, we can store instances of these types in the Purchase Order Link column.

The current user can retrieve any of the data pointed by the Uritype data stored in table 200 The database will automatically fetch the data using the appropriate mechanisms.

For example, the query shown below, retrieves the Purchase Order data pointed to by the Purchase Order Link column:

Select p.PurchaseOrderLink.getXML( )
From PurchaseOrderTable p;

The database will fetch the purchase order through HTTP for the first row, use FTP for the second row and use the DB-Uritype processing mechanism for the last row.

The syntax used in the preceding statements is merely illustrative. The actual syntax may vary from implementation to implementation. The present invention is not limited to any particular syntax. The conversion into the appropriate query is transparent to the current user. Thus, it is not necessary for the current user to be aware of the type of the target data.

Modifying Relational Data Using Uritype Functions

According to certain embodiments, a mechanism is provided to modify, add or delete XML data that is stored in the relational database using the standard URIs and URLs as described herein.

For example, assume that the current user, Scott, is able to see a default virtual visualization of the relational database as follows (not the full visualization):

```
<oradb>
  <SCOTT>
    <EMP>
      <ROW>
        <EMPNO>21</EMPNO>
        <ENAME>John</ENAME>
        <SALARY>100,000</SALARY>
      </ROW>
      <ROW>
        .... <!-- other emp values -->
      </ROW>
      ...
    </EMP>
    .... <!-- other tables.. -->
  </SCOTT>
  <JONES>
    <DEPT>
      <ROW>
        <DEPTNO>1</DEPTNO>
        <DNAME>Marketing</DNAME>
      </ROW>
      <ROW>
        .... <!-- other dept values -->
      </ROW>
    </DEPT>
  </JONES>
</oradb>
```

Further assume that the current user, Scott, would like to update data at the employee-name column of EMP table at the row for which the employee number is 2100. The update comprises changing the name "John" to "Mary".

According to certain embodiments, if the current user, Scott, has direct access to the relational database, then Scott can perform the following: 1) selects the update operation for updating XML data and 2) uses the following XPath expressions:

/SCOTT/EMP/ROW[EMPNO=2100]/ENAME
<ENAME>Mary</ENAME>

The XPath expression /SCOTT/EMP/ROW [EMPNO=2100]/ENAME indicates the row and column of the target data that is to be updated.

The XPath expression <ENAME>Mary</ENAME> indicates the new value of the target data to be updated.

The above XPath expressions are converted into query language statements such as:

UPDATE "SCOTT"."EMP"
SET "ENAME" = 'Mary'
Where "EMPNO" = 2100;

If the current user, Scott, is using a web browser to access target data in the relational database, then according to certain embodiments, a general purpose servlet may be provided to allow the current user to modify, add or delete XML data that is stored in the relational database using the standard URIs and URLs. Using the above example of updating the name "John" to "Mary", a general purpose servlet is provided that allows Scott to perform the following: 1) select the update operation for updating XML data and 2) post to the servlet the "update" information in the form of the following XPath expressions:

/SCOTT/EMP/ROW[EMPNO=2100]/ENAME
<ENAME>Mary</ENAME>

According to certain other embodiments, a special servlet may be provided for each database operation. In other words, there may be an "Insert-servlet" for the INSERT operation, a "Delete-servlet" for the DELETE operation, and an "Update-servlet" for the UPDATE operation.

Using the above example of updating the name "John" to "Mary", an "Insert_servlet" is provided that allows Scott to perform the following: 1) select the update operation for updating XML data and 2) post to the servlet the "update" information in the form of the following XPath expressions:

http://machine-name/<update-servlet>/SCOTT/EMP/ROW[EMPNO=2100]/ENAME
<ENAME>Mary</ENAME>

The same mechanism is used to modify, add or delete metadata. For example, if the current user, Scott would like to delete the schema SCOTT, then Scott can perform the following: 1) selects the delete operation for deleting XML data in the relational database and 2) uses the following XPath expression that indicates which level in the visualized XML document to delete:

http://machine-name/<delete-servlet>/SCOTT

Hardware

Figure 3:
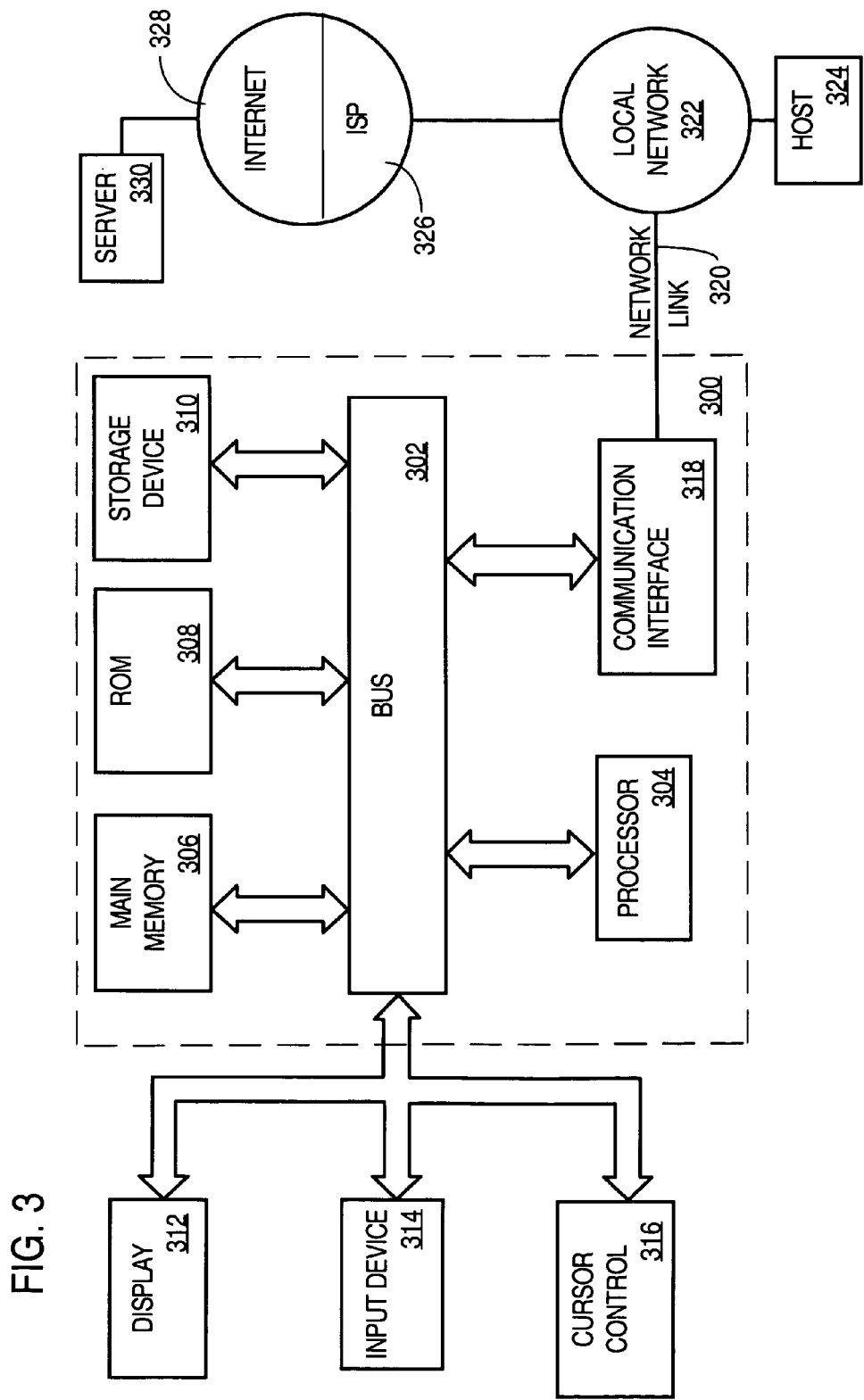
FIG. 3 depicts a computer upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 301, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 301, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing data within a relational database, the method comprising steps of:

receiving, at a relational database system that includes a database server and the relational database, a request including a Uniform Resource Locator (URL) wherein the URL includes an Xpath expression, wherein the Xpath expression specifies a particular relational table of the relational database and a particular column, of the particular relational table, that stores target data;

the relational database system determining, based at least on the Xpath expression, the particular column of the particular relational table of the relational database that corresponds to the target data; and the relational database system retrieving the target data from the particular column of the particular relational table of the relational database;

wherein retrieving the target data includes converting the Xpath expression into a Structured Query Language (SQL) statement that selects data from the particular column of the particular relational table;

wherein the method is performed by a computer system programmed to be a special purpose machine pursuant to instructions from program software.

2. The method of claim 1, wherein the SQL statement selects data only from the particular column of the particular relational table.

3. The method of claim 2, further comprising a step of, prior to receiving the request, the relational database system providing an XML visualization of portions of the relational database to a user, wherein the portions that are included in the XML visualization are included in the XML visualization based on access privileges of the user who is issuing the request.

4. The method of claim 2, further comprising providing an XML visualization, based on the target data, of the particular relational table of the relational database in response to the request.

5. The method of claim 2, further comprising performing operations on the target data after retrieving the target data, wherein the operations on the target data are performed by the relational database system receiving a second Xpath expression and converting the second Xpath expression into a second SQL statement.

6. The method of claim 5, wherein the operations on the target data comprise at least one of updating, deleting, and inserting.

7. The method of claim 3, wherein providing the XML visualization comprises dynamically generating one or more XML schema based on the access privileges that the user has at a time of generating the one or more XML schema.

8. The method of claim 2, wherein the request is an Xpath query.

9. The method of claim 8, wherein the Xpath query is mapped into a SQL query.

10. The method of claim 2, further comprising a step of creating a mapping within the relational database system, wherein, in the mapping, one or more uniform resource identifier references are associated with a plurality of portions of the relational database, and wherein the request includes a particular reference of the one or more uniform resource identifier references.

11. A method for accessing data in a relational database, the method comprising computer-implemented steps of:

establishing a mapping in which Uniform Resource Locators (URLs) point to data items that are stored in rows of one or more relational tables within the relational database, wherein the URLs include XPath expressions that identify at least the one or more relational tables and one or more columns, of the one or more relational tables, in which the data items corresponding to the URLs reside; and locating the data items within the relational database based on location data that is determined based on the Uniform Resource Locators and the mapping, wherein the step of locating includes:

a database server receiving a URL that is mapped to a particular data item, wherein the URL includes an XPath expression that indicates a particular column, in a particular relational table, in which the particular data item resides; and converting the XPath expression into a Structured Query Language (SQL) statement that operates on data items from the particular column of the particular relational table;

wherein the method is performed by a computer system programmed to be a special purpose machine pursuant to instructions from program software.

12. The method of claim 11, wherein the SQL statement operates only on data items from the particular column of the particular relational table.

13. The method of claim 12, further comprising a step of storing the URLs in a corresponding column of the one or more relational tables that store the data items, wherein the URL that maps to the particular data item is stored in said corresponding column, of the particular relational table, within a row associated with that particular data item.

14. The method of claim 13, wherein one or more of the URLs include information indicating a data type of the data items associated with the URLs.

15. The method of claim 12, wherein:
one or more of the URLs do not have portions that indicate information about where the data items reside; and
the method further includes the database server adding the portions to said one or more URLs prior to providing said one or more URLs to any entity outside said database server.

16. The method of claim 12, wherein:
the step of locating is performed by the database server; and
the method further includes the step of the database server generating output in a form of XML documents that include said data items.

17. The method of claim 11, further comprising:
the database server determining data type information of one or more data items that are associated with the one or more URLs by accessing auxiliary information that is stored with the corresponding URL.

18. A method for accessing a data item stored in a relational database, the method comprising the steps of:
generating, within a database server that manages the relational database, a Uniform Resource Locator (URL) that points to the data item based on where the data item resides within a row of a relational table of the relational database;
wherein the URL includes an XPath expression that specifies: (a) the relational table, (b) a particular column of the relational table, and (c) a particular condition on the particular column;
the database server providing the URL to an entity that resides outside the database server;
receiving, at the database server, the URL; and
in response to receiving the URL, resolving the URL within the database server to locate the data item within the row of the relational table;
wherein resolving the URL includes converting the XPath expression into a Structured Query Language (SQL) statement that operates only on rows in the relational table where data in the particular column satisfies the particular condition;
wherein the method is performed by a computer system programmed to be a special purpose machine pursuant to instructions from program software.

19. The method of claim 18, wherein the step of generating the URL includes adding to the URL data that indicates a data type associated with the data item.

20. A computer-readable non-transitory storage medium storing instructions for accessing data within a relational database, the computer-readable medium comprising instructions executable by one or more processors to perform steps of:
receiving, at a relational database system that includes a database server and the relational database, a request that including a Uniform Resource Locator (URL) wherein the URL includes an Xpath expression, wherein said Xpath expression specifies a particular relational table of the relational database and a particular column, of the particular relational table, that stores target data;
the relational database system determining, based at least on the Xpath expression, the particular column of the particular relational table of the relational database that corresponds to the target data; and
the relational database system retrieving the target data from the particular column of the particular relational table of the relational database;
wherein retrieving the target data includes converting the Xpath expression into a Structured Query Language (SQL) statement that selects data from the particular column of the particular relational table.

21. The computer-readable non-transitory storage medium of claim 20, wherein the SQL statement selects data only from the particular column of the particular relational table.

22. The computer-readable non-transitory storage medium of claim 21, further comprising instructions to perform a step of, prior to receiving the request, the relational database system providing an XML visualization of portions of the relational database to a user, wherein the portions that are included in the XML visualization are included in the XML visualization based on access privileges of the user who is issuing the request.

23. The computer-readable non-transitory storage medium of claim 21, further comprising instructions to perform a step of providing an XML visualization, based on the target data, of the particular relational table of the relational database in response to the request.

24. The computer-readable non-transitory storage medium of claim 21, further comprising instructions to perform a step of performing operations on the target data after retrieving the target data, wherein the operations on the target data are performed by the relational database system receiving a second Xpath expression and converting the second Xpath expression into a second SQL statement.

25. The computer-readable non-transitory storage medium of claim 24, wherein the operations on the target data comprise at least one of updating, deleting, and inserting.

26. The computer-readable non-transitory storage medium of claim 22, wherein providing the XML visualization comprises dynamically generating one or more XML schema based on the access privileges that the user has at a time of generating the one or more XML schema.

27. The computer-readable non-transitory storage medium of claim 21, wherein the request is an Xpath query.

28. The computer-readable non-transitory storage medium of claim 27, wherein the Xpath query is mapped into a SQL query.

29. The computer-readable non-transitory storage medium of claim 21, further comprising instructions to perform the step of creating a mapping within the relational database system, wherein, in the mapping, one or more uniform resource identifier references are associated with a plurality of portions of the relational database, and wherein the request includes a particular reference of the one or more uniform resource identifier references.

30. A computer-readable non-transitory storage medium storing instructions for accessing data in a relational database, the computer-readable medium comprising instructions executable by one or more processors to perform steps of:
    establishing a mapping in which Uniform Resource Locators (URLs) point to data items that are stored in rows of one or more relational tables within the relational database, wherein the URLs include XPath expressions that identify at least the one or more relational tables and one or more columns, of the one or more relational tables, in which the data items corresponding to the URLs reside; and
    locating the data items within the relational database based on location data that is determined based on the Uniform Resource Locators and the mapping, wherein the step of locating includes:
        a database server receiving a URL that is mapped to a particular data item, wherein the URL includes an XPath expression that indicates a particular column, in a particular relational table, in which the particular data item resides; and
        converting the XPath expression into a Structured Query Language (SQL) statement that operates on data items from the particular column of the particular relational table.

31. The computer-readable non-transitory storage medium of claim 30, wherein the SQL statement operates only on data items from the particular column of the particular relational table.

32. The computer-readable non-transitory storage medium of claim 31, further comprising instructions to perform the step of storing the URLs in a corresponding column of the one or more relational tables that store the data items, wherein the URL that maps to the particular data item is stored in said corresponding column, of the particular relational table, within a row associated with that particular data item.

33. The computer-readable non-transitory storage medium of claim 32, wherein one or more of the URLs include information indicating a data type of the data items associated with the URLs.

34. The computer-readable non-transitory storage medium of claim 31, wherein:
    one or more of the URLs do not have portions that indicate information about where the data items reside; and
    the computer-readable storage medium further includes instructions to perform the step of the database server adding the portions to said one or more URLs prior to providing said one or more URLs to any entity outside said database server.

35. The computer-readable non-transitory storage medium of claim 31, wherein:
    the step of locating is performed by the database server; and
    the computer-readable medium further includes instructions to perform the step of the database server generating output in a form of XML documents that include said data items.

36. The computer-readable non-transitory storage medium of claim 30, further comprising instructions to perform a step of:
    the database server determining data type information of one or more data items that are associated with the one or more URLs by accessing auxiliary information that is stored with the corresponding URL.

37. A computer-readable non-transitory storage medium storing instructions for accessing a data item stored in a relational database, the computer-readable medium comprising instructions executable by one or more processors to perform steps of:
    generating, within a database server that manages the relational database, a Uniform Resource Locator (URL) that points to the data item based on where the data item resides within a row of a relational table of the relational database;
    wherein the URL includes an XPath expression that specifies: (a) the relational table, (b) a particular column of the relational table, and (c) a particular condition on the particular column;
    the database server providing the URL to an entity that resides outside the database server;
    receiving, at the database server, the URL; and
    in response to receiving the URL, resolving the URL within the database server to locate the data item within the row of the relational table;
    wherein resolving the URL includes converting the XPath expression into a Structured Query Language (SQL) statement that operates only on rows in the relational table where data in the particular column satisfies the particular condition.

38. The computer-readable non-transitory storage medium of claim 37, wherein the step of generating the URL includes adding to the URL data that indicates a data type associated with the data item.

* * * * *

UNITED STATES PATENT AND TRADEMARK OFFICE
CERTIFICATE OF CORRECTION

| | | |
|---|---|---|
| PATENT NO. | : 7,873,649 B2 | |
| APPLICATION NO. | : 09/949020 | |
| DATED | : January 18, 2011 | |
| INVENTOR(S) | : Muralidhar Krishnaprasad et al. | |

It is certified that error appears in the above-identified patent and that said Letters Patent is hereby corrected as shown below:

On the first page, in field (54), and in column 1, lines 1-3, title, delete "METHOD AND MECHANISM FOR IDENTIFYING TRANSACTION ON A ROW OF DATA" and insert -- METHOD AND APPARATUS FOR XML VISUALIZATION OF A RELATIONAL DATABASE AND UNIVERSAL RESOURCE IDENTIFIERS TO DATABASE DATA AND METADATA --, therefor.

On page 2, in column 2, under "Other Publications", line 33, delete "Mangement" and insert -- Management --, therefor.

On page 2, in column 2, under "Other Publications", line 56, delete "Standarized" and insert -- Standardized --, therefor.

On page 3, in column 1, under "Other Publications", line 24, delete "XQuey" and insert -- XQuery --, therefor.

On sheet 4 of 5, in Figure 2B, Reference numeral 271, line 1, delete "servelet" and insert -- servlet --, therefor.

On sheet 4 of 5, in Figure 2B, Reference numeral 272, line 1, delete "servelet" and insert -- servlet --, therefor.

In column 7, line 34-54, Delete " ———————————— " and

Signed and Sealed this
Tenth Day of July, 2012

David J. Kappos
*Director of the United States Patent and Trademark Office*

CERTIFICATE OF CORRECTION (continued)
U.S. Pat. No. 7,873,649 B2 insert --
```
<oradb>
    <SCOTT>
        <EMP>
            <ROW>
            <ROW>
            ... <!--multiple ROW tag pairs-each pair
            corresponding to a Single row>
        </EMP>
    </SCOTT>
    <JONES>
        <DEPT>
            <ROW>
            </ROW>
            ... <!--multiple ROW tag pairs - each pair
            corresponding to a single row>
        </DEPT>
    </JONES>
</oradb>
```
--, therefor.

In column 10, line 13, delete "200" and insert -- 200. --, therefor.

In column 12, line 18, delete "301," and insert -- 310, --, therefor.

In column 13, line 60, delete "301," and insert -- 310, --, therefor.

In column 16, line 23, in claim 20, before "including" delete "that".